Figure 1:
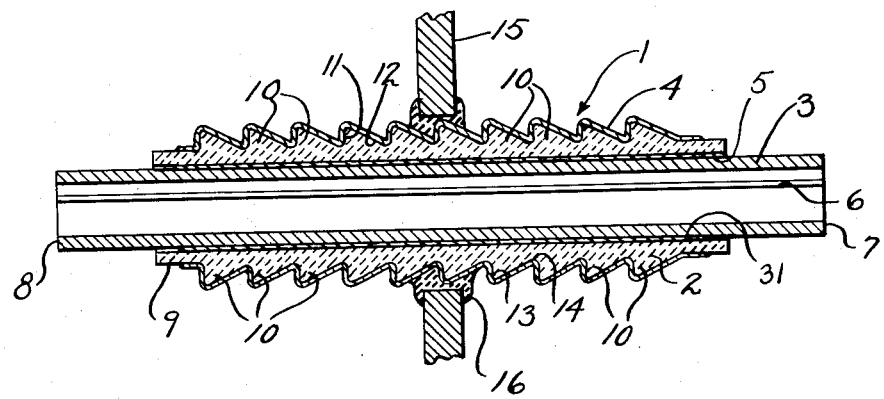

July 25, 1961     H. M. SCHLICKE     2,994,048
HIGH FREQUENCY CAPACITOR OF CORRUGATED CONFIGURATION
Filed March 14, 1958

INVENTOR
HEINZ M. SCHLICKE

BY Quarles, Fox, Seidel,
Bateman & Hoar
ATTORNEYS

United States Patent Office 2,994,048
Patented July 25, 1961

2,994,048
HIGH FREQUENCY CAPACITOR OF
CORRUGATED CONFIGURATION
Heinz M. Schlicke, Fox Point, Wis., assignor to Allen-Bradley Company, Milwaukee, Wis., a corporation of Wisconsin
Filed Mar. 14, 1958, Ser. No. 721,577
9 Claims. (Cl. 333—79)

This invention relates to capacitors used in high frequency applications, and it more specifically resides in a capacitor having a high dielectric constant for the interelectrode material wherein at one, or both, of the electrodes there is presented a ridge that functions as a filter to eliminate resonance characteristics, that may otherwise be observable, and thereby maintain a low transfer impedance through the capacitor over the entire frequency range for which the capacitor is intended.

In working with the high frequencies, for example, of the order of 100 megacycles per second, phenomena that occur in the use of high dielectric capacitor units alter the impedance characteristics to a degree that capacitive values alone may no longer be considered the sole dominant parameters. Inductive and resonant properties are no longer de minimis, as at lower frequencies, and may not be considered to be so. For example, a resonant condition may occur at a frequency of 100 megacycles per second in capacitors of high K dielectrics which have electrode areas and spacing that provide 20,000 micro-microfarads. The resulting resonant condition sharply increases the transfer impedance through the capacitor, and thereby seriously impairs the effectiveness for particular applications. That such resonance, of a form characteristic of a cavity, will occur in the small capacitor units of the type herein discussed becomes readily apparent when one recognizes that at a frequency of 100 megacycles wave length in air is three meters, and within a capacitor body, i.e. the dielectric material, the wave length is reduced by a factor of one over the square root of the dielectric constant. Thus, for a K of 10,000 the wave length shortens to three centimeters, and the dielectric dimensions will well exceed one half the wave length if practical capacitance values are to be maintained.

A particular application in which resonant conditions impair the operation is that of feed-through capacitors. This type of capacitor is commonly found in television and military devices where high frequency circuits are confined within a shielded enclosure that has leads extending through the enclosure for the introduction of D.C. and low frequency voltages. The high frequency generated within the enclosure must be precluded from traveling outwardly along the D.C. and low frequency source leads, and to accomplish this end a feed-through capacitor is located at the entrance of each lead to within the enclosure. One electrode of a capacitor is joined to the lead and the opposite electrode to the enclosure. The capacitor then presents a low transfer impedance from the lead to the enclosure for the high frequencies, while being a barrier to the D.C. or low frequencies. In the event a resonant condition occurs in the capacitor, for the high frequencies encountered, the transfer impedance rises so as to defeat the intended purpose of a low impedance by-pass for frequencies that readily radiate.

In the present invention, a construction for the dielectric body is provided that will not have an objectionable resonance, as would otherwise occur at some of the intended frequencies. This construction presents upstanding ridges along an electrode which imparts a generally sawtooth cross section that lends a corrugated appearance to the capacitor. The geometry thus presented acts as a high pass filter, and the cut-off frequency is selected for a value above most frequencies for which the capacitor is intended to present a low impedance. Working such a geometric filter below cut-off frequency effectively eliminates phase shift. Without occurrence of an appreciable phase shift along the capacitor internal currents of resonance are minimized, and hence harmful resonance will not occur. With the elimination of these resonant type internal currents the maintenance of a low transfer impedance through the capacitor over the full intended range of high frequencies is insured. For a feed-through capacitor in conjunction with a shielded enclosure the high frequencies will then be effectively transferred to the enclosure. The foregoing operation introduces a seemingly anomaly of the use of a high pass filter to conduct the lower frequencies near and below cut-off with a minimum of impedance. The rationale of the paradox lies in the fact that the filter effects desired pertain to elimination of phase shift, and that the attenuation through the capacitor may be retained at a small value.

It is an object of this invention to provide a capacitor with a high dielectric constant in which resonant conditions are minimized in the range of intended working frequencies.

It is another object of this invention to provide a capacitor with a high dielectric constant in which the physical geometry at the electrodes presents a high pass filter.

It is another object of this invention to provide a capacitor having a low transfer impedance over a substantial range of high frequencies to thereby function as a feed-through capacitor.

It is another object of this invention to provide a tubular feed-through capacitor having enhanced frequency response characteristics.

It is another object of this invention to de-resonate high dielectric value capacitors.

The foregoing and other objects of this invention will appear from the description to follow. In the description reference is made to the accompanying drawing in which there is shown by way of illustration and not of limitation specific forms in which the invention may be embodied.

Figure 2:
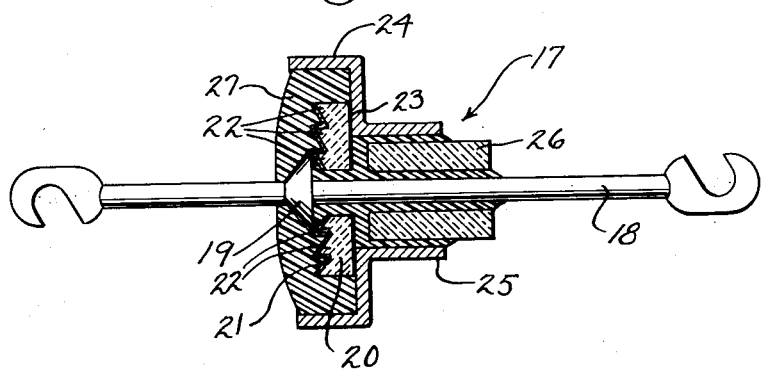
Figure 3:
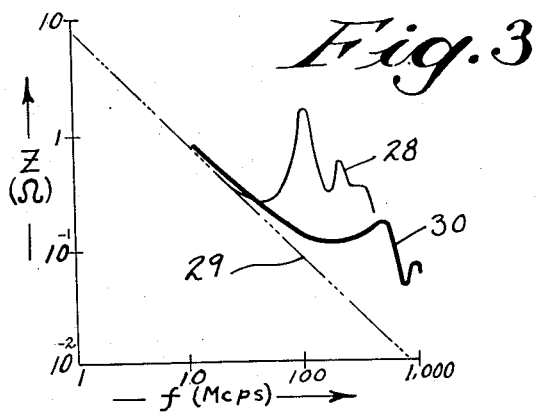

In the drawing:

FIG. 1 is a view in longitudinal section of a tubular feed-through capacitor in which the invention is embodied, FIG. 2 is a longitudinal view in section of a discoidal type feed-through capacitor in which the invention is embodied, and FIG. 3 is a graph depicting representative frequency response characteristics of a feed-through capacitor such as exemplified by FIG. 1 together with a capacitor not in conformance with the invention.

Referring now to the drawing, there is shown in FIG. 1 a tubular feed-through capacitor generally indicated by the numeral 1. The capacitor 1 is composed of four principal units which comprise a dielectric 2 of a generally tubular figuration, a conductor 3 extending through the dielectric 2, an inner electrode 31, and an outer electrode 4. The dielectric 2 is composed of a material selected from that group of dielectrics having a high dielectric constant K, and values in the order of 250 to 10,000 are representative. Such high dielectric materials are generally composed of titinates, with several frequently being selected, then being blended and fired to present a finished ceramic. These materials are well known in the art and may be selected, blended and treated in accordance with established procedures.

The inner longitudinal boundary 5 of the dielectric 2 constitutes a smooth walled circular cylindrical opening extending from one end to the other. The silver electrode 31, which is reduced from a silver paste by firing in a well known manner, is in intimate contact with the boundary 5, and in tight engagement with the electrode 31 is the conductive feed-through conductor 3. The conductor 3 has a lengthwise slit 6 which permits it to be circumferentially compressed before insertion within the dielectric 2, so that upon insertion it may resiliently exert an expanding force to maintain tight intimate contact with the electrode 31. Also, since the temperature coefficients of expansion for the dielectric 2 and conductor 3 are not evenly matched the slot 6 may accommodate for uneven dimensional changes with temperature change.

The conductor 3 extends beyond the ends of the dielectric 2, so as to present attachment ends 7 and 8 which are adapted to be electrically joined to current carrying conductors, which in this instance are not shown. Thus, the conductor 3 will serve as a conductor passing through the capacitor 1 for the purpose of conducting direct current, or currents of low frequency, from one end of the capacitor 1 to the opposite end.

Opposite the inner boundary 5 of the dielectric material 2 is a longitudinal outer boundary 9 which forms the circumferential outer surface of the dielectric 2. When viewed in section, as in FIG. 1, the outer boundary 9 appears as having a saw-tooth configuration which is formed by a plurality of circumferentially extending ridges 10 that are set adjacent to one another. The ridges 10 give a generally corrugated appearance to the exterior of the capacitor 1.

In the capacitor 1 of FIG. 1 each ridge 10 is comprised of a radially extending face 11 that is substantially perpendicular to the longitudinal axis and a frusto-conical face 12 that slopes radially inward from the radially outer extent of its associated face 11 to meet with the inner radial terminus of the perpendicular face 11 of the next adjacent ridge 10. The purpose and function of the cascaded ridges 10 will be hereinafter described.

The outer electrode 4 is received by the outer boundary 9, and more particularly the faces 11 and 12 which comprise the circumferentially extending ridges 10. The outer electrode 4, similarly as the electrode 31, may be composed of a silver paste which is fired in accordance with usual practices for capacitor construction. The outer electrode 4 should form a continuous electrode surface extending from one end of the cascaded ridges 10 to the opposite end. To insure that the peaks 13 of the ridges 10 do not protrude through the outer electrode 4 they are slightly rounded. In this manner, when the silver paste of the outer electrode 4 is fired it will not flow away from the peaks 13 and leave exposed edges. Also, it is desirable to slightly round the valleys 14 between adjacent ridges 10 by having small fillets at these points. In this manner, mechanical internal stresses may be reduced to minimize possible fracturing, and also the capacitance distribution along the electrodes is enhanced.

The capacitor 1 of FIG. 1 is shown mounted in an opening of a metallic shield 15. The metallic shield 15 may be part of an enclosure for such a device as a television tuner in which high frequencies are generated and handled, or some other portion of a chassis to which it is desired to by-pass high frequencies which may be traveling along the conductor 3. The connection between the metallic shield 15 and the outer electrode 4 of the capacitor 1 may be accomplished by the deposition of a suitable solder 16, and it is usually not essential to select any particular point along the outer boundary 9, or electrode 4, at which the shield 15 should be attached.

Referring now to FIG. 2, there is shown therein a discoidal type capacitor 17 also constructed in accordance with the teaching of the invention. Here, the capacitor is again of the feed-through type and has a solid feed-through conductor 18 with a frusto-conical flange 19 near its mid-point. A dielectric 20 is provided which is in the general form of a disc with a central opening, and is of a material similar to that of the dielectric 2 of the capacitor 1. One face of the dielectric 20 is shaped with a plurality of concentric circumferentially extending ridges 22 which present a saw-tooth or corrugated configuration similarly as the ridges 10 of the capacitor 1, when viewed in section. The ridges 22 are coated with a silver paste electrode 21 which is attached by a suitable solder to the flange 19 of the conductor 18. The opposite face of the dielectric 20 is flat and is covered with a silver paste electrode 23 which in turn is jointed through a suitable solder to the inside of a cup like housing 24. The cup like housing 24 has a tubular neck 25 which receives a tubular sheath 26 which closely surrounds the feed-through conductor 18. The sheath 26 is of an insulating material such as a steatite porcelain and acts to electrically isolate the feed-through conductor 18 from the housing 24. The open left end of the housing 24 is filled with a resinous materials 27, such as an epoxy, and the epoxy is also deposited between the sheath 26 and its adjacent conductor 18 and neck 25 to adhere the elements one to another. The resin 27 forms a protective bedding for the capacitor which protects the dielectric 20 and its electrode plates 21, and 23 from physical abuse and adverse ambient conditions.

The mode of operation of a capacitor embodying the invention will be discussed with particular reference to the tubular capacitor 1 of FIG. 1. In the absence of the ridges 10 a tubular capacitor would be had in which resonance effects would appear at particular frequencies. For such resonant conditions the transfer impedance through the capacitor would sharply increase and thereby impair operation when employed as a feed-through capacitor. This detrimental impairment is represented by a curve 28 of FIG. 3, and this curve 28 is a typical curve for a circular cylindrical feed-through capacitor of 20,000 micro-microfarads using a dielectric of $K=5500$. In FIG. 3 the ordinate is a measurement of transfer impedance, such as from conductor 3 to metallic shield 15, in ohms and the abscissa is frequency in megacycles per second. Curve 29 represents an ideal capacitor, with the impedance decreasing linearly with increasing frequency. Such an ideal curve is based on a pure capacitance without resonant effects, or inductive effects due to lead length, being considered. In comparison with the ideal curve 29, the transfer impedance of a capacitor presenting curve 28 is seen to rise sharply at frequencies of the order of 100 megacycles, and again at higher frequencies. These frequencies lie within the range for which feed-through capacitors must often present a low transfer impedance, and for FIG. 3 a typical practical range is shown as extending up to 1,000 megacycles. A capacitor embodying the teaching of this invention, such as capacitor 1 of FIG. 1, will present a reduced transfer impedance in this high frequency range with the curve 30 in FIG. 3 being typical. For curve 30 a capacitor of 20,000 micro-microfarads with $K=5500$ was again selected.

Consider now the tubular capacitor of FIG. 1, and more particularly an axial length constituting a single ridge 10. The slope of the boundary face 12 presents a geometry that acts as a high pass filter, and the dimensions for the sloping face 12 are selected to have the stop band of the filter cover the frequency range for which the capacitor 1 is to present a low transfer impedance. That is, intended working frequencies for the capacitor 1 fall within the stop band of a geometric filter presented by the sloping face 12 of each ridge 10. The intermediate faces 11 are preferably prependicular to the axis of the capacitor 1, as they are not intended to present dominant circuit parameters. For the capacitor of curve 30 in FIG. 3, the stop band of the arrangement as a whole will extend to above 1000 megacycles, although the cut-off frequency of a single ridge may be at a lower frequency than that of the entire arrangement. In the geometric filter of the invention no appreciable phase shift will occur for frequencies in the stop band, and since a phase shift is essential for resonance no detrimental internal resonance will occur. Hence, transfer impedance will not rise to large values in the intended range of working frequencies, and it is kept at a desired low value. Curve 30 is a representative showing of results obtainable, and it should further be noted that the attenuation along the electrode 4 may be kept small, to thereby permit transfer impedance to remain a low value. In this fashion a high pass filter is utilized to enhance a low transfer impedance for frequencies below the pass band.

The dimensions of a ridge 10 are dependent upon the cut-off frequency and the dielectric constant. For high frequencies and high dielectric constants the ridge 10 becomes quite small, and consequently the capacitance available in but a single ridge is usually insufficient. Hence, ridges 10 of FIG. 1 and ridges 22 of FIG. 2 are cascaded, one adjacent another. The ridges need not be entirely independent of one another, but for example, may constitute a continuous thread in FIG. 1, or a spiral in FIG. 2. The ideal configuration for the sloping ridge faces 12, as seen in cross section, is an exponential line. However, since the lengths of the ridges become quite short, in the order of millimeters, manufacture is difficult, and it has been found that the approximation of the exponential line by a straight line is satisfactory. Slight rounds at both peaks and bases of the ridges are also desirable, as hereinbefore explained. Mechanical strength is then improved, and also the more important consideration of distributing the capacity along the length of the capacitor without undue concentration is enhanced.

Practice of the invention is primarly intended for frequencies greater than those of radio broadcast, which frequencies range upwardly into the very high and ultra high values. At these values distributed parameter behavoir must be accounted for as well as the lumped behavoir characteristics of individual impedances. Also, the invention relates to dielectric materials of a high K value wherein wave lengths at the intended frequencies become quite short. Frequencies greater than ten megacycles and dielectric constants above 250 represent those values for which the invention will find particular use. Internal resonant conditions may then occur in plain capacitors which do not embody the invention. For capacitors of the invention, on the other hand, wider frequency ranges may be utilized without encountering detrimental resonance.

The relation between ridge dimensions of a tubular capacitor to the frequency at which the first undesirable pronounced peak in the transfer impedance occurs rests in complex mathematical analysis. However, mathematical theory has been developed to where basic design approximations has been stated. For the relation between ridge length and the frequency $f_p$, at which the first undesirable pronounced peak in impedance occurs, the following may be stated as a generalization:

$$l = \frac{3\pi 10^8}{2\omega_p \sqrt{K}}$$

in which $l$ is ridge length in meters, $\omega_p$ is $2\pi f_p$ and K is the dielectric constant. To furnish a concept of the order of magnitude of $l$ a ratio of 1, as given by the above equation, to the wave length in a uniform coaxial tubular dielectric of like K and at $f_p$ may be stated. This is done by dividing the above equation by the usual computation for wave length in a high dielectric material, namely $$\lambda = \frac{3 \cdot 10^8}{F\sqrt{K}}$$

The resulting ratio gives a ridge length in the order of one-fourth the wave length that would exist in a uniform tubular dielectric.

Thus, for a frequency $f_p$ of 1,000 megacycles and a dielectric value of 1,000 the wave length in a uniform tubular capacitor would be about ten millimeters and ridge length would be about 2½ millimeters.

The other basic design equation relates a cut-off frequency $f_c$ of a single ridge to ridge dimensions. This frequency $f_c$ will be found to be considerably less than the frequency $f_p$, and it is stated as follows:

$$f_c = \frac{3 \cdot 10^8 F}{4\pi l \sqrt{K}}$$

wherein $l$ is again ridge length, K is dielectric constant and F is the natural logarithm of the ratio of the natural logarithm of $D_1/d$ to the natural logarithm of $D_2/d$. $D_1$ is the maximum diameter at the peak of a ridge, $D_2$ is the minimum diameter at the valleys between ridges and $d$ is the diameter at the electrode 31. By following these relations capacitors may be constructed in accordance with the invention.

I claim:
1. In a capacitor for frequencies greater than ten megacycles the combination comprising a high K dielectric having oppositely disposed boundary surfaces adapted to receive electrodes with one of said boundary surfaces having a plurality of upstanding ridges of substantially triangular cross section; and electrodes disposed upon said boundary surfaces to define opposite capacitor electrodes with one of the electrodes covering the ridges of its associated boundary surface, each ridge and the portion of the electrode thereon forming a high pass filter to waves in the capacitor whereby said ridges present a cut-off frequency greater than frequencies for which the capacitor is intended.

2. In a capacitor the combination comprising an interelectrode dielectric of a high K titanate material, said dielectric having a pair of opposite boundary surfaces with one surface having a plurality of upstanding ridges adjacent and paralleling one another in which each ridge has a face substantially perpendicular to the boundary surface and a sloping face to present a substantially triangular cross section; and conductive electrodes received by said opposite boundary surfaces with one electrode following the contour of said ridges to present a series of geometric filters to currents conducted by the electrode.

3. In a capacitor the combination comprising an interelectrode dielectric having oppositely disposed boundaries, one of said boundaries having a ridge in the form of a geometric filter with a cut-off frequency above a range of very high frequencies, which ridge has one face substantially normal to the capacitor and a sloping face departing from the first face; and conductive electrodes disposed upon said boundaries with one electrode following the contour of said ridge.

4. In a capacitor the combination of a dielectric material of tubular configuration substantially symmetrical about its axis with oppositely disposed boundary surfaces presented by longitudinally extending inner and outer walls of the tubular configuration, one of said boundary surfaces having circumferentially extending ridges adjacent one another is cascaded relation with each ridge having a longitudinal cross section of a radially extending line and a sloping line which runs from the outer radial extent of the radial line inwardly to the radially inner end of the radial line of the next adjacent ridge; and a pair of electrically opposite electrodes disposed upon said boundary surfaces with one electrode following the contour of said ridges to form a filter for waves in said capacitor that has a pass band extending above frequencies for which the capacitor is intended.

5. In a capacitor the combination of a dielectric material of tubular configuration substantially symmetrical about its axis with oppositely disposed boundary surfaces presented by longitudinally extending inner and outer walls of the tubular configuration, at least one of said boundary surfaces having circumferentially extending ridges adjacent one another in stacked relation, with each ridge having a triangular longitudinal cross section of a radially extending line and a sloping line which runs inwardly from the outer radial extent of the radial line to thereby form a geometric high pass filter that precludes internal resonance below the pass band frequencies; and a pair of electrically opposite electrodes disposed upon said boundary surfaces with one of the electrodes following the contour of said ridges.

6. In a capacitor the combination of a pair of electrically opposite electrodes that are each of a generally tubular configuration substantially symmetrical about its axis with one electrode within the other, one of said electrodes having circumferentially extending ridges adjacent one another with each ridge having a longitudinal cross section of a substantially radially extending line and a sloping line which runs inwardly toward the opposite electrode from the outer radial extent of the radial line to thereby form a geometric high pass filter; and a dielectric material interposed between said electrodes which includes ridges that match the ridges of said electrode.

7. In a capacitor for high frequencies that readily radiate from a conductor the combination of a feed-through conductor; an inter-electrode dielectric of a high K value which encircles said conductor; and a pair of opposed capacitor electrodes in intimate contact with the dielectric that are each characterized by a pair of boundary edges, one of said electrodes having a configuration along its interface with the dielectric that comprises a series of ridges running transverse to a line drawn between said boundary edges of the electrode to present geometric high pass filters to currents conducted across the electrode, wherein the stop band of the filters covers a range of frequencies for which the capacitor is intended.

8. In a capacitor for high frequencies that readily radiate from a conductor the combination of an inter-electrode dielectric of a high K value; and a pair of opposed capacitor electrodes each in intimate contact with the dielectric wherein one of said electrodes has a configuration along its interface with the dielectric that comprises a series of ridges running transverse to electrode currents of resonance to thereby present geometric high pass filters to currents conducted across the electrode wherein the stop band of the filters covers a range of frequencies for which the capacitor is intended.

9. In a capacitor the combination comprising oppositely disposed conductive electrodes with at least one electrode having a series of corrugations which form upstanding ridges cascaded one after another; and a dielectric material disposed between said electrodes filling the inter-electrode space and particularly the corrugations of said one electrode; each ridge of said corrugations being of triangular cross section with the triangle thereof having a first edge normal to the capacitor and a second edge sloping inwardly from the outer terminus of the first edge to form a filter for waves in the capacitor that passes frequencies greater than those for which said capacitor is intended.

References Cited in the file of this patent
UNITED STATES PATENTS

| | | |
|---|---|---|
| 1,578,288 | Hough | Mar. 30, 1926 |
| 1,869,131 | Butler | July 26, 1932 |
| 1,910,228 | Austin | May 23, 1933 |
| 2,751,561 | King | June 19, 1956 |
| 2,756,375 | Peck | July 24, 1956 |
| 2,759,155 | Hackenberg | Aug. 14, 1956 |

OTHER REFERENCES

"Sprague Button Geramic Capacitors," Electronic Design, May 1955, page 31.

UNITED STATES PATENT OFFICE
CERTIFICATE OF CORRECTION

Patent No. 2,994,048　　　　　　　　　　　　　　　　　　July 25, 1961

Heinz M. Schlicke

It is hereby certified that error appears in the above numbered patent requiring correction and that the said Letters Patent should read as corrected below.

Column 4, line 8, for "jointed" read -- joined --; line 16, for "materials" read -- material --; column 5, line 49, for "has" read -- have --; column 6, line 53, for "is" read -- in --.

Signed and sealed this 28th day of November 1961.

(SEAL)
Attest:

ERNEST W. SWIDER　　　　　　　　　　　　　　　DAVID L. LADD
Attesting Officer　　　　　　　　　　　　　　　Commissioner of Patents

USCOMM-DC